(12) United States Patent
Cluet et al.

(10) Patent No.: US 12,447,880 B2
(45) Date of Patent: Oct. 21, 2025

(54) VEHICLE SEAT

(71) Applicant: Faurecia Sièges d'Automobile, Nanterre (FR)

(72) Inventors: Mathieu Cluet, Etampes (FR); Jérôme Planson, Angerville (FR); Fabrice Charras, Montrouge (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 146 days.

(21) Appl. No.: 18/193,344

(22) Filed: Mar. 30, 2023

(65) Prior Publication Data
US 2023/0406180 A1 Dec. 21, 2023

(30) Foreign Application Priority Data
Mar. 31, 2022 (FR) .................. FR 22 02946

(51) Int. Cl.
*B60N 2/70* (2006.01)
*B60N 2/68* (2006.01)

(52) U.S. Cl.
CPC ........... *B60N 2/7094* (2013.01); *B60N 2/686* (2013.01)

(58) Field of Classification Search
CPC ...... B60N 2/7094; B60N 2/686; B60N 2/986; B60N 2/0292; B60N 2/62
USPC .......................... 297/452.27, 452.61, 440.22
See application file for complete search history.

(56) References Cited

U.S. PATENT DOCUMENTS

| | | | | |
|---|---|---|---|---|
| 3,612,607 A | * | 10/1971 | Lohr | A47C 7/18 297/452.61 |
| 4,781,417 A | * | 11/1988 | Shipman | B60N 2/686 297/DIG. 2 |
| 6,070,939 A | * | 6/2000 | Matsuo | B60N 2/3013 296/68.1 |
| 6,226,819 B1 | * | 5/2001 | Ogawa | A47C 7/18 5/653 |
| 6,247,751 B1 | * | 6/2001 | Faust | B60N 2/5635 297/180.13 |
| 8,678,505 B2 | * | 3/2014 | Kanda | B60N 2/7011 297/452.56 |

(Continued)

FOREIGN PATENT DOCUMENTS

| | | | | |
|---|---|---|---|---|
| GB | 2355400 A | * | 4/2001 | ............... A47C 7/18 |
| JP | 2014151766 A | | 8/2014 | |
| WO | 2018226200 A1 | | 12/2018 | |

OTHER PUBLICATIONS

French Search Report corresponding to application FR 2202946, dated Nov. 17, 2022, 2 pages.

*Primary Examiner* — Milton Nelson, Jr.
(74) *Attorney, Agent, or Firm* — Reising Ethington P.C.

(57) ABSTRACT

A vehicle seat having a seat cushion extending substantially along a plane defined by a longitudinal direction and a transverse direction, with the seat cushion including a cushion part and a cushion part support that includes a first lateral part, a second lateral part opposite the first lateral part in the transverse direction, and an intermediate part located between the first and second lateral parts in the transverse direction. The intermediate part is recessed relative to the lateral parts in an elevation direction and the cushion part is mounted on the cushion part support and extends at least partly into an accommodating space of the cushion part delimited by the first lateral part, the second lateral part, and the intermediate part.

23 Claims, 7 Drawing Sheets

(56) References Cited

U.S. PATENT DOCUMENTS

| | | | |
|---|---|---|---|
| 9,694,723 B2* | 7/2017 | Shimizu | B60N 2/66 |
| 9,950,650 B1* | 4/2018 | Watanabe | B60N 2/01583 |
| 10,988,065 B2* | 4/2021 | Clark | B60N 2/646 |
| 2014/0183846 A1* | 7/2014 | Fujiwara | B60R 21/233 |
| | | | 280/729 |
| 2014/0225407 A1* | 8/2014 | Nagayasu | B60N 2/7047 |
| | | | 297/344.1 |
| 2014/0272266 A1* | 9/2014 | Svilar | A47C 7/24 |
| | | | 112/475.08 |
| 2017/0267141 A1 | 9/2017 | Line et al. | |
| 2022/0227269 A1* | 7/2022 | Ishizuka | A47C 7/62 |

* cited by examiner

VEHICLE SEAT

TECHNICAL FIELD

The present invention relates to a vehicle seat.

BACKGROUND

Conventionally, such a seat comprises a seat cushion comprising a cushion part permanently attached to an internal structure.

The cushion part is in particular intended to support the body of a user of the seat. The internal structure, for its part, ensures that the cushion part is rigidly connected to the vehicle body.

Such a seat consequently has a single configuration that may not be adapted to varied users.

For example, such a seat may have satisfactory seating comfort for certain users and insufficient for others. This seating comfort depends in particular on the corpulence of the user.

Also, such a seat may have aesthetics that may not be suitable for certain users.

Finally, such a seat may have a resistance to impacts and other aggressive elements that are insufficient for certain users.

SUMMARY

One of the aims of the invention is to overcome these disadvantages by proposing a vehicle seat, the resistance, aesthetics and comfort of which are easily changeable.

To that end, the invention relates to a vehicle seat comprising a seat cushion extending substantially along a plane defined by a longitudinal direction and a transverse direction, the seat cushion comprising:
- a cushion part comprising a main seat cushion surface intended to support at least a part of the body of a user of the seat;
- a cushion part support comprising a first lateral part, a second lateral part opposite the first lateral part in the transverse direction and an intermediate part located between the first and second lateral parts in the transverse direction, the intermediate part extending recessed relative to the lateral parts in an elevation direction substantially perpendicular to the longitudinal and transverse directions;
  - wherein the cushion part is mounted on the cushion part support and extends at least partly into an accommodating space of the cushion part delimited by the first lateral part, the second lateral part, and the intermediate part.

The seat has an improved resistance to deterioration, especially due to the presence of the cushion part support.

Furthermore, the cushion part support makes it possible to modulate the comfort provided by the seat cushion.

Finally, the lateral parts of the cushion part support are visible and constitute aesthetic elements of the seat in their own right.

Various embodiments of the vehicle seat may include the following features, taken in isolation or in any technically conceivable combination:
- the first lateral part and the second lateral part are intended to hold the at least part of the user's body of the seat in the transverse direction;
- the seat cushion has a width, defined in the transverse direction between a first end and a second end, the first and second lateral parts of the cushion part support each having a width, defined in the transverse direction between a first end and a second end, the ratio corresponding to the sum of the widths of the first and second lateral parts of the cushion part support over the width of the seat being between 1/6 and 1/2;
- each lateral part of the cushion part support comprises a central portion, a joining portion to the intermediate part of the cushion part support extending substantially in the elevation direction and a covering portion extending substantially parallel to the joining portion;
- the seat cushion comprises an internal structure, the cushion part and the cushion part support being mounted on the internal structure, the internal structure comprising a first lateral part and a second lateral part opposite the first lateral part of the internal structure in the transverse direction, the first and second lateral parts of the internal structure delimiting a volume wherein the intermediate part of the cushion part support and the cushion part at least partially extend;
- the first lateral part of the cushion part support is mounted on the first lateral part of the internal structure and the second lateral part of the cushion part support is mounted on the second lateral part of the internal structure;
- each lateral part of the cushion part support at least partially covers the lateral part of the internal structure on which it is mounted;
- the cushion part and the cushion part support are detachably mounted on the internal structure, the cushion part and the cushion part support being adapted to be replaced by an auxiliary cushion part and cushion part support;
- the internal structure is made of a metallic material;
- the central portion, the joining portion and the covering portion delimit an insertion space of a lateral part of the internal structure;
- the first lateral part and the second lateral part of the cushion part support each comprise a complementary seat cushion surface intended to support at least part of the body of the seat's user, said complementary seat cushion surfaces extending on either side of the main base surface;
- the complementary seat cushion surfaces extend in the continuity of the main seat cushion surface;
- the cushion part is made of a foam material, the cushion part support being made of a plastic material;
- the cushion part comprises a plurality of foam layers superimposed on each other in the elevation direction;
- at least one foam layer extends entirely in the accommodating space;
- the cushion part extends at least partially over each of the lateral parts of the cushion part support;
- at least one foam layer extends at least partially over each of the lateral parts of the cushion part support;
- at least one foam layer extends at least partially in the accommodating space and at least partially over each of the lateral parts of the cushion part support;
- the cushion part comprises at least two auxiliary foam layers each extending at least partially over a lateral part of the cushion part support, respectively;
- the cushion part extends entirely into the accommodating space;
- the seat cushion further comprises an upholstery at least partially covering the cushion part;
- the upholstery covers only the cushion part;

the upholstery at least partially covers the cushion part support; and the upholstery is made of textile, optionally coated with plastic, or leather.

BRIEF DESCRIPTION OF THE DRAWINGS

Other aspects and advantages of the invention will become apparent on reading the following description, given by way of example and made with reference to the appended drawings, in which.

DETAILED DESCRIPTION

In the following, a longitudinal direction X parallel to the sagittal/median plane of the seat, a transverse direction Y substantially perpendicular to the longitudinal direction X and substantially parallel to the extension plane of a vehicle floor on which the vehicle is intended to be mounted and an elevation direction Z substantially perpendicular to the longitudinal X and transverse Y directions are defined.

A front and a rear are also defined such that the front corresponds to the direction towards which a user of the seat faces in the longitudinal direction X when they are seated on the seat and the rear is opposite to the front.

With reference to FIGS. 1 to 7, a vehicle seat 1 according to an embodiment of the invention is described.

Figure 1:
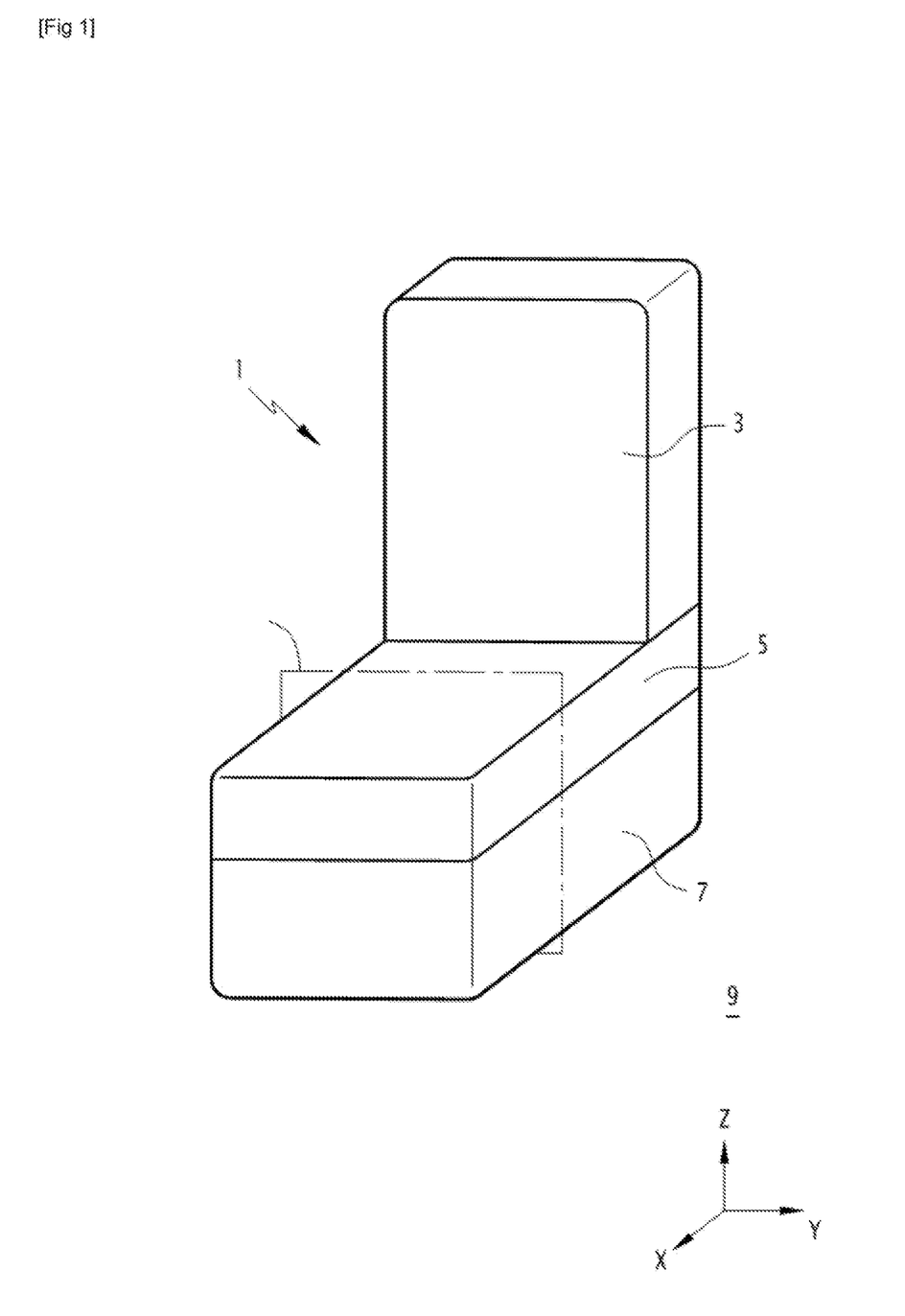
FIG. 1 is a schematic perspective view of a vehicle seat according to an embodiment of the invention.

The vehicle seat 1 comprises a backrest 3 and a seat cushion 5, the backrest 3 being mounted on the seat cushion 5.

As shown in FIG. 1, the vehicle seat 1 further comprises an upright 7 on which the seat cushion 5 is mounted. The upright 7 in particular rigidly connects the seat cushion 5 and the backrest 3 to a floor 9 of the vehicle.

The backrest 3 is conventional and will not be described in more detail here.

The seat cushion 5 extends substantially along a plane defined by the longitudinal direction X and the transverse direction Y. In other words, the seat cushion 5 has dimensions in the longitudinal X and transverse Y directions as well as in the elevation direction Z, the dimensions of the seat cushion 5 in the longitudinal X and transverse Y directions being greater than the dimensions of the seat cushion 5 in the elevation direction Z.

The seat cushion 5 comprises a cushion part 16 having a main seat cushion surface 48 intended to support at least part of the body of a user of the seat 1 and a cushion part support 14. Advantageously, the seat cushion 5 further comprises an internal structure 12 and an upholstery 18 at least partially covering the cushion part 16.

The seat cushion 5 has a width L1, defined in the transverse direction Y between a first end 6A and a second end 6B.

Figure 2:
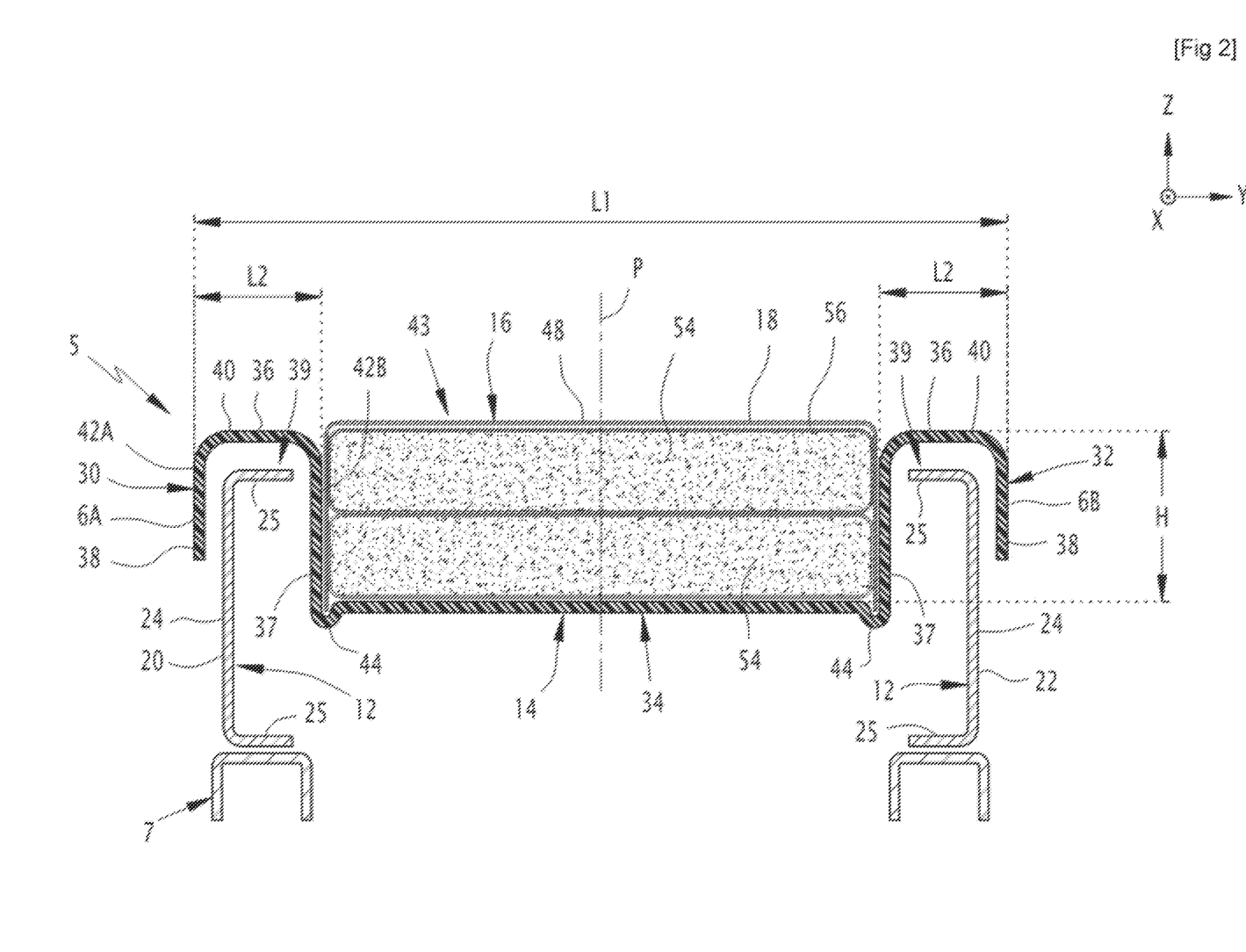
FIG. 2 is a schematic sectional view of the vehicle seat of FIG. 1, in the plane II.
Figure 4:
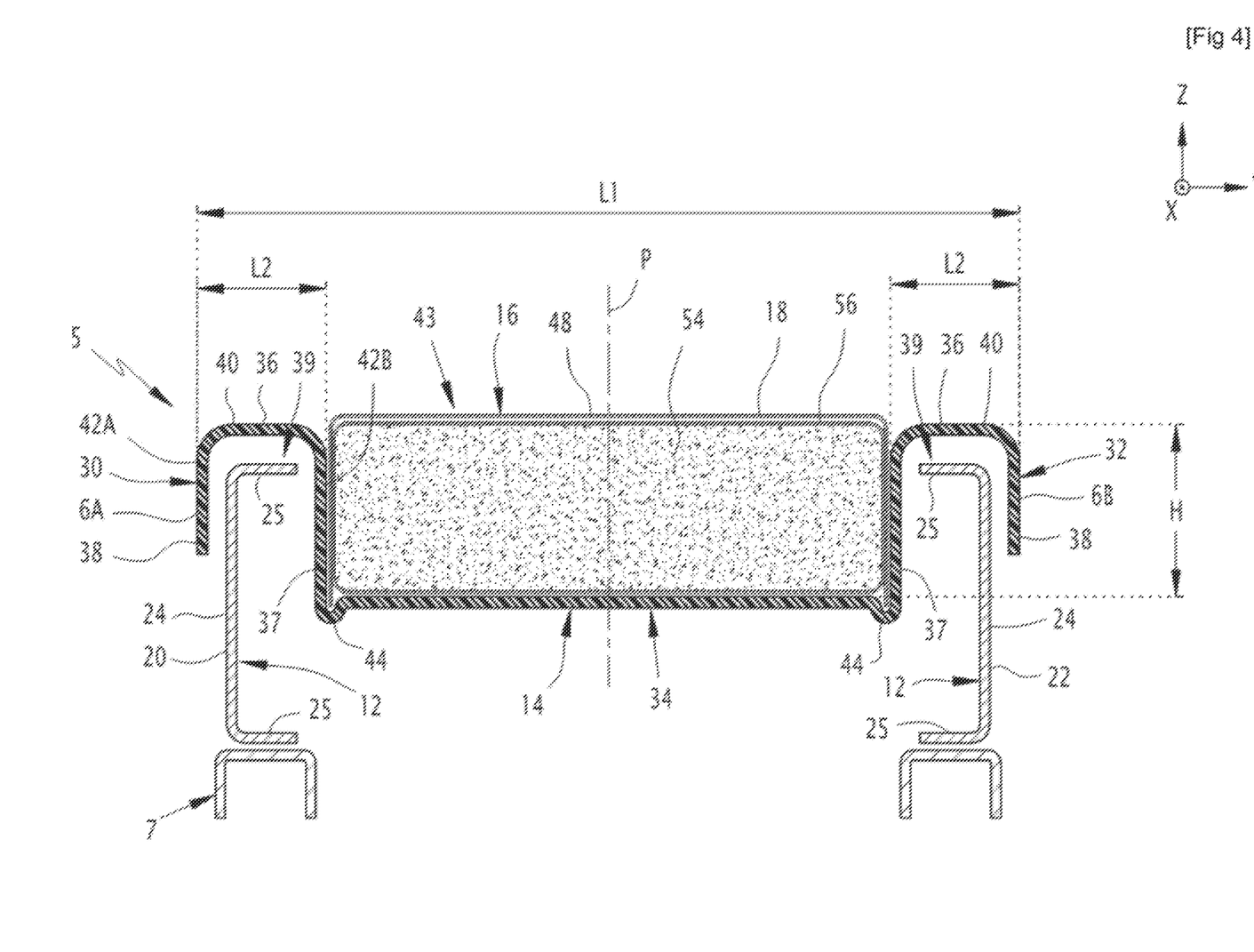
FIG. 4 is a schematic sectional view of another embodiment of a seat cushion of the vehicle seat of FIG. 1.

As shown in FIGS. 2 and 4, the internal structure 12 is, for example, permanently mounted on the upright 7 of the seat 1 and constitutes a support for the cushion part 16 and the cushion part support 14. For example, the internal structure 12 is attached to the upright 7 of the seat 1 by screwing and/or welding.

The internal structure 12 is, for example, made of a metal material, especially steel.

The internal structure 12 helps the seat cushion 12 resist deformations and impacts.

As shown in FIGS. 2 and 4, the internal structure 12 comprises a first lateral part 20 and a second lateral part 22 opposite the first lateral part 20 in the transverse direction Y.

The first lateral part 20 and the second lateral part 22 extend for example substantially in the elevation direction Z.

According to the example shown in FIGS. 2 and 4, each lateral part 20, 22 has a U shape. Each lateral part 20, 22 especially comprises a base 24 extending substantially in a plane defined by the elevation Z and longitudinal X directions and two branches 25 extending at opposite ends of the base 24 in the elevation direction Z. Each branch 25 extends substantially in a plane defined by the longitudinal X and transverse Y directions.

A branch 24 of each lateral part 20, 22 extends facing the upright 7 so as to be attached thereto. As will be explained in more detail below, the opposite branch 24 extends facing a lateral part 30, 32 of the cushion part support 14.

According to the example shown in FIGS. 2 and 4, the lateral parts 20, 22 of the internal structure 12 are substantially symmetrical relative to a median sagittal plane P of the seat cushion 5.

The first and second lateral parts 20, 22 delimit a volume in which, as will be described in more detail below, the cushion part support 14 and the cushion part 16 at least partially extend.

As shown in the example of FIGS. 2 and 4, the cushion part support 14 is mounted on the internal structure 12. For example, the cushion part support 14 is attached to the internal structure 12, especially on a rear tube of the internal structure 12, in particular by hooking-in, still in particular by means of at least one hook open towards the front, preferentially two hooks open towards the front. For example, the cushion part support 14 further is clipped onto the internal structure 12, especially on the rear tube of the internal structure 12, via at least one clip, preferentially two clips.

The cushion part support 14 is especially detachably mounted on the internal structure 12 and is able to be replaced by an auxiliary cushion part support (not shown) which will be described in more detail below.

The cushion part support 14 is, for example, made of a plastic material, especially a mixture of polyethylene and polypropylene (PE/PP mixture), preferably in a PE/PP mixture comprising mineral fillers.

Advantageously, the cushion part support 14 is made from a single piece.

Also advantageously, the cushion part support 14 is made of a material that is more rigid than that of the cushion part 16.

The cushion part support 14 comprises a first lateral part 30, a second lateral part 32 opposite the first lateral part 30 in the transverse direction Y and an intermediate part 34 located between the first and second lateral parts 30, 32 in the transverse direction Y.

Advantageously, the first lateral part 30 and the second lateral part 32 are intended to hold the at least part of the user's body of the seat 1 in the transverse direction Y. In particular, when the user sits on the seat cushion 5, their pelvis pushes slightly into the cushion part 16 so as to be held transversely by the lateral parts 30 and 32.

Still advantageously, the first lateral part 30 of the cushion part support 14 is mounted on the first lateral part 20 of the internal structure 12 and the second lateral part 32 of the cushion part support 14 is mounted on the second lateral part 22 of the internal structure 12.

According to the examples shown in FIGS. 2 and 4, the first lateral part 30 has a U shape. The first lateral part 30 especially comprises a central portion 36, a joining portion 37 to the intermediate part 34 of the cushion part support 14 and a covering portion 38 extending substantially parallel to the joining portion 37.

In particular, the joining 37 and covering 38 portions extend respectively from opposite ends of central part 36 in the transverse direction Y. Thus, the joining 37 and covering 38 portions form the branches of the U and the central portion 36 forms the base of the U.

As shown in the examples of FIGS. 2 and 4, the central portion 36 extends substantially in a plane defined by the longitudinal X and transverse Y directions. The joining 37 and covering portions extend substantially in a plane defined by the longitudinal X and elevation Z directions.

The joining portion 37 extends opposite the median sagittal plane P of the seat cushion 5, between the covering portion 38 and the median sagittal plane P in the transverse direction Y.

Advantageously, the central portion 36, the joining portion 37 and the covering portion 38 delimit an insertion space 39 of a lateral part 20, 22 of the internal structure 12.

According to the examples shown in FIGS. 2 and 4, the second lateral part 32 is substantially symmetrical to the first lateral part 30 with respect to the median sagittal plane P of the seat cushion 5.

In other words, the second lateral part 32 further comprises a central portion 36, a joining portion 37 and a covering portion 38 as described above.

Advantageously, each joining portion 37 helps to keep the at least part of the body of the user of the seat 1 in the transverse direction Y when the user is seated on the seat cushion 5.

As shown in the examples of FIGS. 2 and 4, each lateral part 30, 32 of the cushion part support 14 at least partially covers the lateral part 20, 22 of the internal structure 12 on which it is mounted.

In particular, the covering portion 38 at least partially covers the corresponding base 24. According to a particular example, the covering portion 38 covers the entirety of the base 24, such that the corresponding lateral part 20, 22 is not visible from the outside of the seat cushion 5. This makes it possible in particular to improve the aesthetics of the seat cushion 5 by hiding, for example, elements of the internal structure 12.

According to one embodiment, each lateral part 30, 32 of the cushion part support 14 comprises a complementary seat cushion surface 40 intended to support at least part of the body of the user of the seat 1. The seat cushion surface 40 is said to be "complementary" relative to the "main" seat cushion surface 48 of the cushion part 16.

In particular, each central portion 36 defines the corresponding complementary seat cushion surface 40. More particularly, the complementary seat cushion surface 40 is formed by the outward-pointing face of the central portion 36.

Each lateral part 30, 32 of the cushion part support 14 has a width L2, defined in the transverse direction Y between a first end 42A and a second end 42B.

The width L2 corresponds in particular to the width of the central portion 36 of the corresponding lateral part 30, 32.

The ratio corresponding to the sum of the widths L2 of the first and second lateral parts 30, 32 of the cushion part support 14 over the width L1 of the seat cushion is advantageously between 1/6 and 1/2. Thus, a specific part of the body of the user of the seat 1 can be supported directly by the lateral parts 30, 32 of the cushion part support 14, which contributes to the seating comfort of the seat 1.

By way of example, the width L1 of the seat is substantially equal to 50 cm and the width L2 of the respective lateral parts 30, 32 is substantially equal to 9 cm. The ratio is here equal to 18/50, that is approximately 0.36.

The intermediate part 34 of the cushion part support 14 extends recessed relative to the lateral parts 30, 32 of the cushion part support 14 in the elevation direction Z. In particular, the intermediate part 34 extends into the volume delimited by the first and second lateral parts 20, 22 of the internal structure 12.

The intermediate part 34 extends in particular substantially in a plane defined by the longitudinal X and transverse Y directions, offset by a height H in the elevation direction Z relative to the extension plane of the central portions 36. The height H is for example between 40 mm and 100 mm. According to a particular example, the height H substantially corresponds to a thickness of the cushion part 16 taken in the elevation direction Z, between a lower end and an upper end of the cushion part 16.

Figure 3:
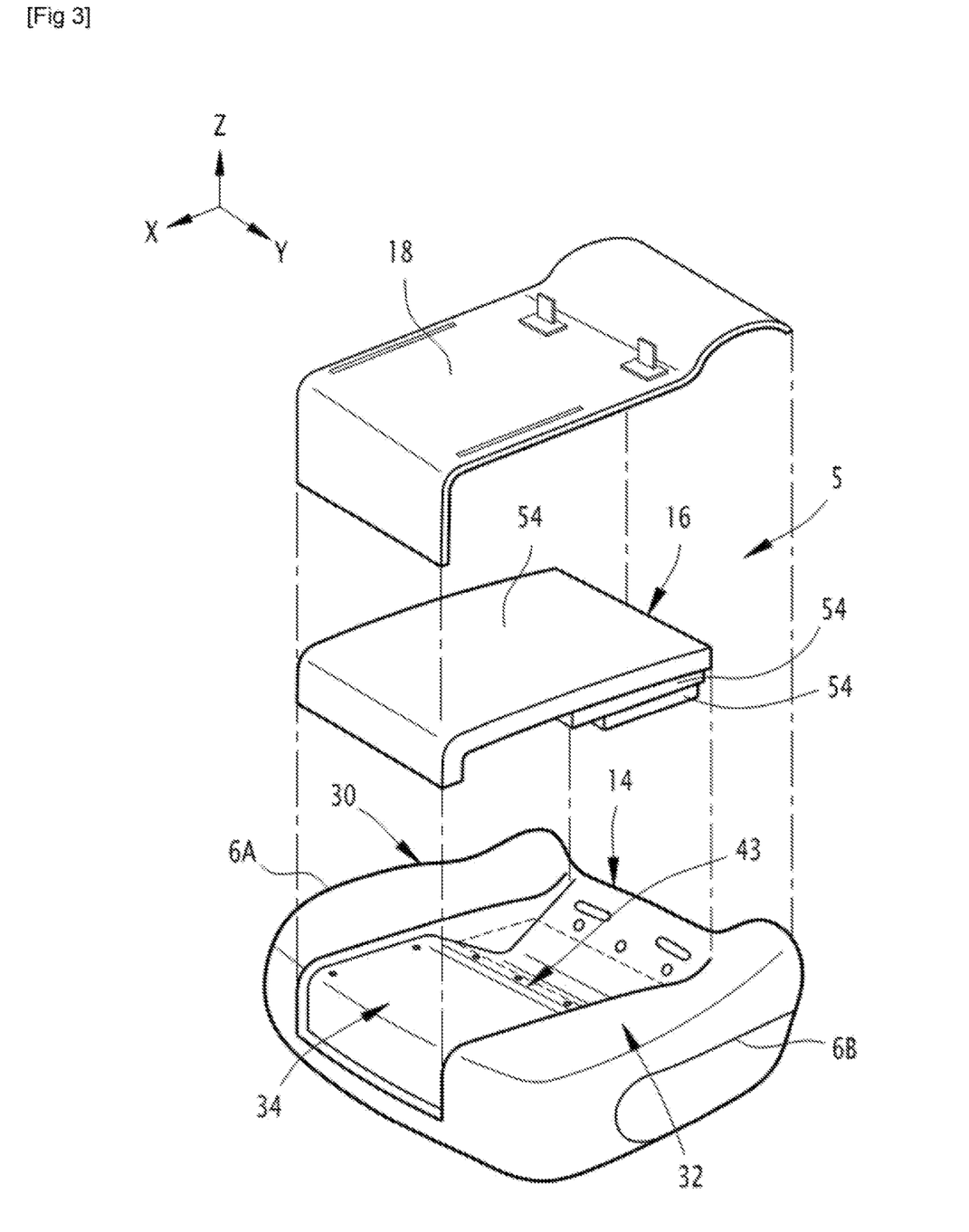
FIG. 3 is a schematic perspective view of one embodiment of a seat cushion of the vehicle seat of FIG. 1.

As shown in FIGS. 2, 3 and 4, the intermediate part 34 extends between the ends of the joining portions 37 of the lateral parts 30, 32 of the cushion part support 14, opposite the respective central portions 36.

The intermediate part 34, the first lateral part 30 and the second lateral part 32 delimit an accommodating space 43 of the cushion part 16.

In particular, when the user sits on the seat cushion 5, their pelvis pushes slightly into the accommodating space 43 of the cushion part 16 so as to be held transversely by the lateral parts 30 and 32.

According to the examples shown in FIGS. 2 and 4, the intermediate part 34 comprises two grooves 44 extending substantially in the longitudinal direction X, on either side of the intermediate part 34. The grooves 44 are in particular intended to receive a portion of the upholstery 18, in particular to attach the upholstery 18 to secure the cushion part 16 and the cushion part support 14.

Advantageously, as shown in FIGS. 2 and 4, the grooves 44 are respectively defined at the junctions between the intermediate part 44 and the lateral parts 30, 32 of the cushion part support 14.

As shown in FIGS. 2, 3 and 4, the cushion part 16 is mounted on the cushion part support 14 and extends at least partially into the accommodating space 43.

According to a particular embodiment shown in FIG. 3, the cushion part 16 extends entirely into the accommodating space 43. According to the embodiments shown in FIGS. 5 to 7, the cushion part 16 extends at least partially over each of the lateral parts 30, 32.

Advantageously, the cushion part 16 is mounted on the internal structure 12, in particular by means of the cushion part support 14.

The cushion part 16 is advantageously detachably mounted on the internal structure 12 and is able to be replaced by an auxiliary cushion part (not shown) described in more detail below.

For example, the cushion part 16 comprises the main seat cushion surface 48 intended to support at least part of the body of a user of the seat 1. According to the examples shown in FIGS. 2 and 4, the complementary seat cushion surfaces 40 extend on either side of the main seat cushion surface 48, in the transverse direction Y. For example, the complementary seat cushion surfaces 40 of the cushion part support 14 extend in the continuity of the main seat cushion surface 48. "In the continuity" means that the complementary seat cushion surfaces 40 follow the general shape of the main seat cushion surface 48 to form a continuous total seat cushion surface (formed by the main seat cushion surface 48 and the complementary seat cushion surfaces 40). Alternatively, the main seat cushion surface 48 extends substantially in a plane parallel to the longitudinal X and transverse Y directions while being offset by a value of between 5 mm and 50 mm relative to the extension plane of the complementary seat cushion surfaces 40 in the elevation direction Z. This offset between the main seat cushion surface 48 and the extension plane of the complementary seat cushion surfaces 40 in the direction Z is especially chosen according to the desired type of comfort.

The cushion part 16 is for example made of a foam material, especially of polyurethane (PU) or polyester foam, or PU foam comprising granules of recycled materials.

Advantageously, the cushion part 16 is at least partially enveloped by the upholstery 18. According to an example not shown, the cushion part 16 is entirely enveloped by the upholstery 18. The upholstery 18 is in particular made of textile, optionally coated with plastic, or leather. Alternatively, the upholstery 18 is for example made of a plastic material, for example polyester. According to one example, the upholstery 18 covers only the cushion part 16. According to another example, the upholstery at least partially covers the cushion part support 14.

As shown in FIGS. 2, 3 and 4, the cushion part 16 comprises a plurality of foam layers 54, especially two foam layers 54, superimposed on one another in the elevation direction Z.

According to the example shown in FIG. 3, the cushion part 16 comprises three foam layers 54.

Each foam layer 54 is advantageously entirely covered with an additional upholstery 56 made of a plastic material such as polyester.

According to one example, at least one foam layer 54 extends entirely in the accommodating space 43. Advantageously, according to the embodiments shown in FIGS. 5 and 6, at least one foam layer 54 extends at least partially over each of the lateral parts of the cushion part support 14.

Figure 5:
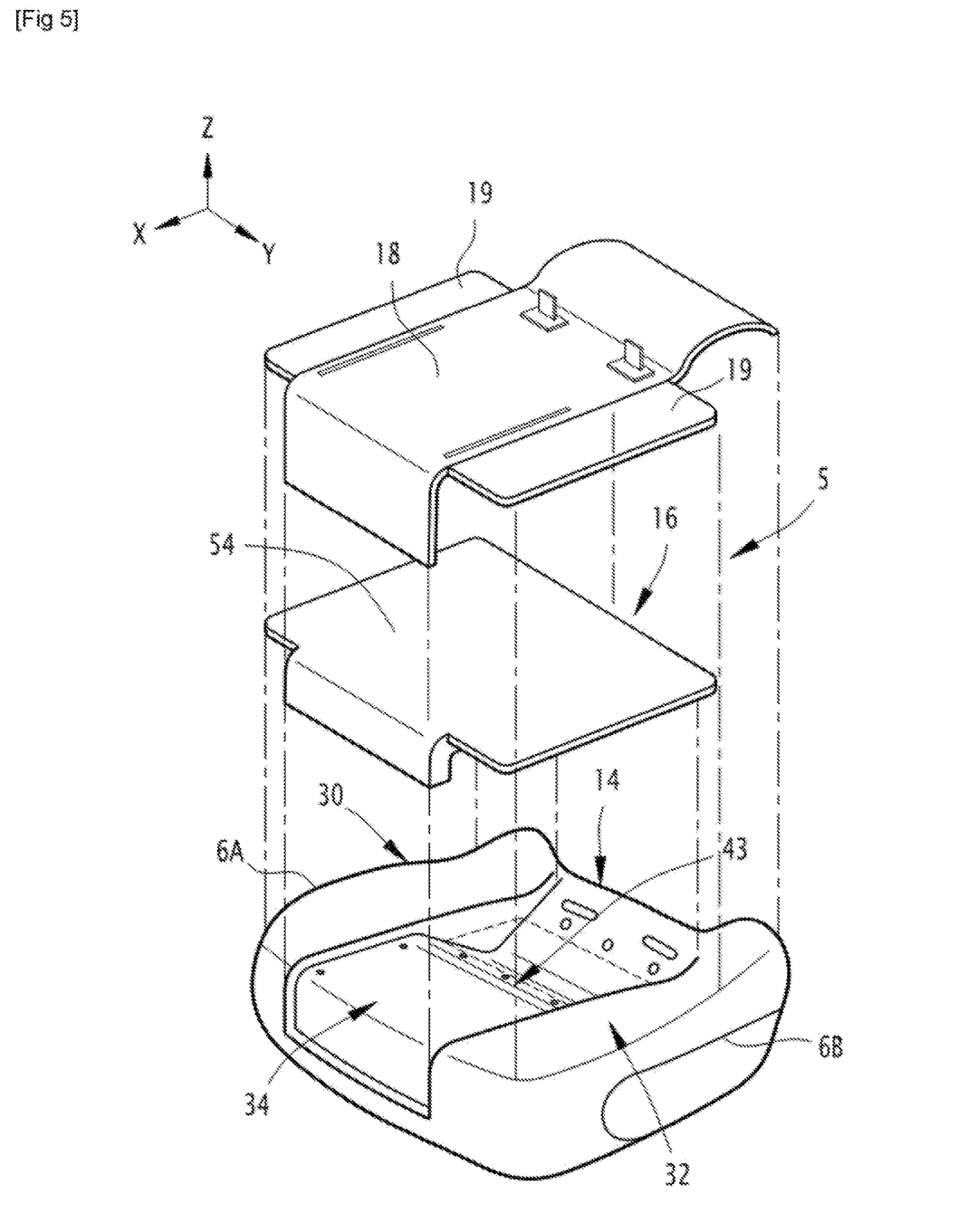
FIG. 5 is a schematic perspective view of another embodiment of a seat cushion of the vehicle seat of FIG. 1.
Figure 6:
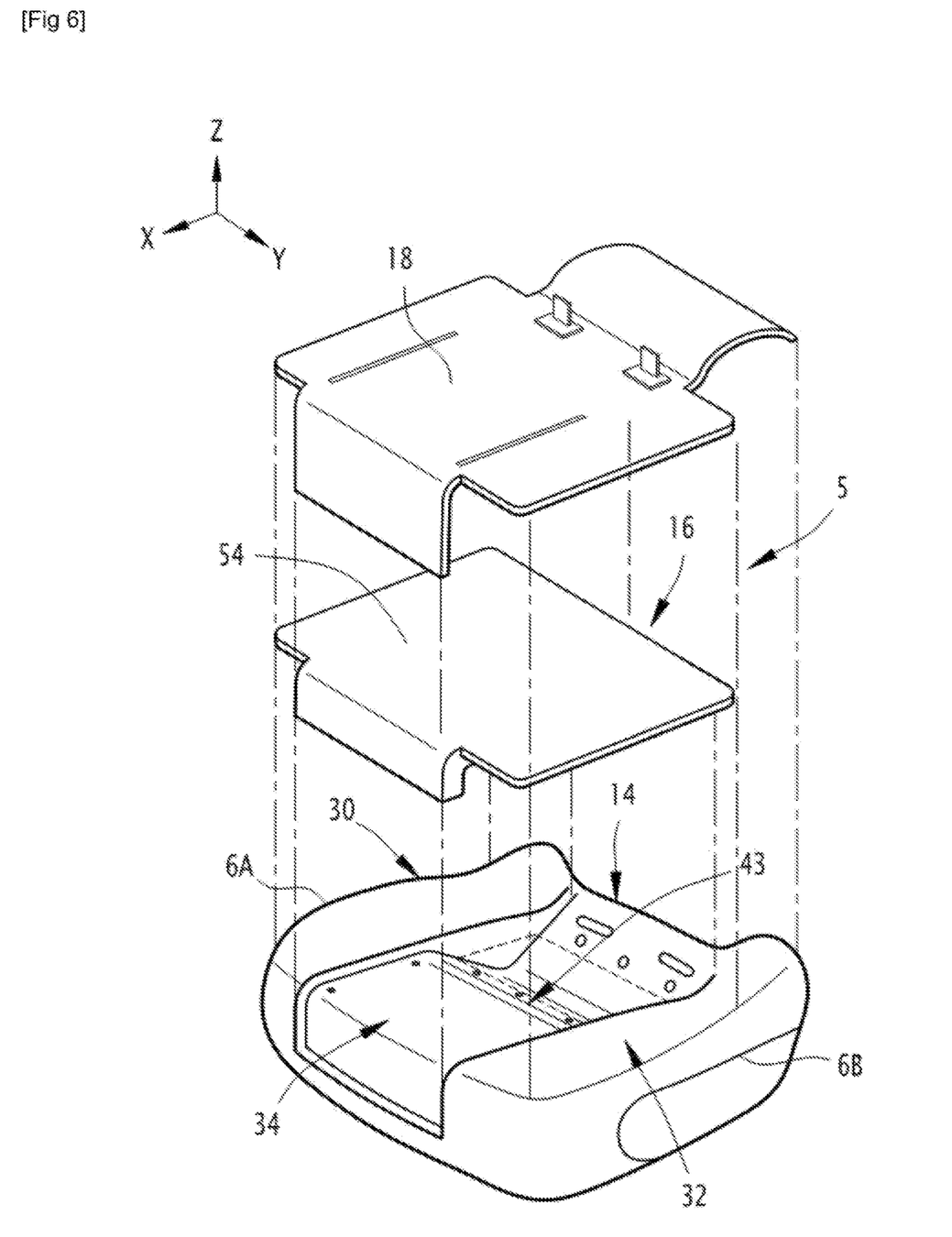
FIG. 6 is a schematic perspective view of another embodiment of a seat cushion of the vehicle seat of FIG. 1.

According to another example, according to the embodiments shown in FIGS. 5 and 6, at least one foam layer 54 extends at least partially into the accommodating space 43 and at least partially over each of the lateral parts 30, 32 of the cushion part support 14.

Figure 7:
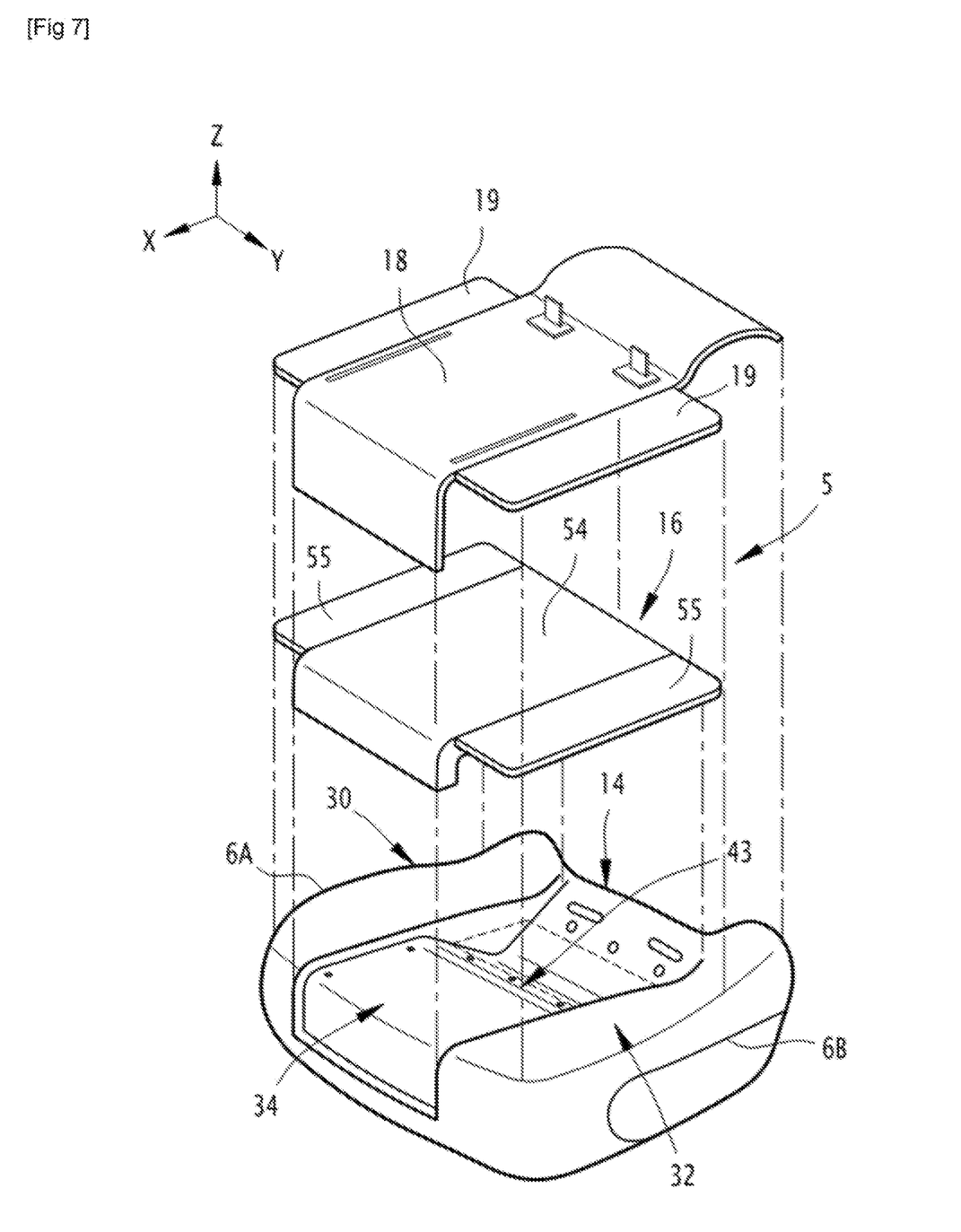
FIG. 7 is a schematic perspective view of another embodiment of a seat cushion of the vehicle seat of FIG. 1.

According to the embodiment shown in FIG. 7, the cushion part 16 comprises at least two auxiliary foam layers 55 each extending at least partially over a lateral part 30, 32 of the cushion part support 14, respectively. In particular, as shown in FIG. 7, the cushion part 16 comprises exactly two auxiliary foam layers 55, each auxiliary foam layer 55 extending over a lateral part 30, 32 of the cushion part support 14.

According to the embodiment shown in FIG. 7, the seat cushion 5 further comprises an auxiliary upholstery 19, separate from the upholstery 18, at least partially covering the cushion part 16, in particular the auxiliary foam layers 55. For example, each auxiliary foam layer 55 is covered by an auxiliary upholstery 19.

According to another embodiment shown in FIG. 4, the cushion part 16 comprises a single foam layer 54, extending in particular entirely into the accommodating space 43.

The auxiliary cushion part support and the auxiliary cushion part are respectively similar to the cushion part supports 14 and the cushion part 16.

Advantageously, the auxiliary cushion part support and the auxiliary cushion part differ respectively from the cushion part support 14 and the cushion part 16 with respect to:
the materials of which they are made;
the ratio of the sum of the widths of the first and second lateral portions of the auxiliary cushion part support to the width of the seat cushion; and
the proportion of the lateral part 20, 22 of the internal structure 12 covered by the covering portions.

Thus, replacing the cushion part support 14 and the cushion part 16 with the auxiliary cushion part support and the auxiliary cushion part, respectively, makes it possible to modify the seating comfort, to add additional functionalities (it is possible for example to provide an auxiliary cushion part and auxiliary cushion part support comprising a heating mat), to customize the upholstery, etc.

This thus makes it possible to easily modify certain parameters of the seat cushion 5 in order to adapt it to the desires of a user by swapping the cushion part support 14 and the cushion part 16 for another cushion part support and another cushion part.

Advantageously, the seat 1, in particular the seat cushion 5, has increased resistance to impacts and deterioration, in particular due to the presence of the cushion part support 14.

Furthermore, the seat cushion 5 has an improved, sophisticated aesthetic, insofar as the lateral parts 30, 32 of the cushion part support 14 can be distinct from the cushion part 16 or alternatively can easily match the appearance of the cushion part 16 depending on what is desired.

Also, the seat cushion 5 has improved comfort insofar as the user can bear on the cushion part 16 but also on the cushion part support 14. The sensation that the user feels on the seat cushion 5, in particular of being held in place, is improved.

Finally, the embodiment of the invention described above makes it possible to easily adapt the seat 1 to a plurality of varied user profiles by easily replacing the cushion part support 14 and the cushion part 16 with another cushion part support and another cushion part that have different characteristics.

The invention claimed is:

1. A vehicle seat comprising a seat cushion extending substantially along a plane defined by a longitudinal direction and a transverse direction, the seat cushion comprising:
a cushion part comprising a main seat cushion surface intended to support at least part of the body of a user of the seat; and
a cushion part support comprising a first lateral part, a second lateral part opposite the first lateral part in the transverse direction, and an intermediate part located between the first and second lateral parts in the transverse direction, the intermediate part being recessed relative to the lateral parts in an elevation direction substantially perpendicular to the longitudinal and transverse directions;
wherein the cushion part is mounted on the cushion part support and extends at least partly into an accommodating space for accommodating the cushion part, the accommodating space being delimited by the first lateral part, the second lateral part, and the intermediate part, and wherein the seat cushion comprises an internal structure, the cushion part and the cushion part support being mounted on the internal structure, the internal structure comprising a first lateral part and a second lateral part opposite the first lateral part of the internal structure in the transverse direction, the first and second lateral parts of the internal structure delimiting a volume in which the intermediate part of the cushion part support and the cushion part at least partially extend, and wherein each lateral part of the cushion part support comprises a central portion, a joining portion for joining to the intermediate part of the cushion part support, the joining portion extending substantially in the elevation direction, and a covering portion extending substantially parallel to the joining portion.

2. The vehicle seat according to claim 1, wherein the first lateral part and the second lateral part of the cushion part support are intended to hold the at least one part of the body of the user of the seat in the transverse direction.

3. The vehicle seat according to claim 1, wherein the seat cushion has a width, defined in the transverse direction between a first end and a second end, the first and second lateral parts of the cushion part support each having a width, defined in the transverse direction between a first end and a second end, the ratio corresponding to the sum of the widths of the first and second lateral parts of the cushion part support to the width of the seat cushion being between 1/6 and 1/2.

4. The vehicle seat according to claim 1, wherein the first lateral part and the second lateral part of the cushion part support each comprise a complementary seat cushion surface intended to support at least part of the body of the user of the seat, said complementary seat cushion surfaces extending on either side of the main seat cushion surface.

5. The vehicle seat according to claim 4, wherein the complementary seat cushion surfaces extend in continuity with the main seat cushion surface.

6. The vehicle seat according to claim 1, wherein the first lateral part of the cushion part support is mounted on the first lateral part of the internal structure and the second lateral part of the cushion part support is mounted on the second lateral part of the internal structure.

7. The vehicle seat according to claim 6, wherein each lateral part of the cushion part support at least partially covers the lateral part of the internal structure on which it is mounted.

8. The vehicle seat according to claim 1, wherein the cushion part and the cushion part support are detachably mounted on the internal structure, the cushion part and the cushion part support being adapted to be replaced by an auxiliary cushion part and cushion part support.

9. The vehicle seat according to claim 1, wherein the internal structure is made of a metallic material.

10. The vehicle seat according to claim 1, wherein the cushion part extends at least partially over each of the lateral parts of the cushion part support.

11. The vehicle seat according to claim 10, wherein the cushion part comprises a plurality of foam layers superimposed on one another in the elevation direction, and wherein at least one foam layer extends at least partially over each of the lateral parts of the cushion part support.

12. The vehicle seat according to claim 10, wherein the cushion part comprises a plurality of foam layers superimposed on one another in the elevation direction, and wherein at least one foam layer extends at least partially in the accommodating space and at least partially over each of the lateral parts of the cushion part support.

13. The vehicle seat according to claim 1, wherein the cushion part is made of a foam material, the cushion part support being made of a plastic material.

14. The vehicle seat according to claim 1, wherein the cushion part comprises a plurality of foam layers superimposed on one another in the elevation direction.

15. The vehicle seat according to claim 14, wherein at least one foam layer extends entirely in the accommodating space.

16. The vehicle seat according to claim 14, wherein the cushion part comprises at least two auxiliary foam layers each extending at least partially on a lateral part of the cushion part support, respectively.

17. The vehicle seat according to claim 1, wherein the cushion part extends entirely into the accommodating space.

18. The vehicle seat according to claim 1, wherein the seat cushion further comprises an upholstery at least partially covering the cushion part.

19. The vehicle seat according to claim 18, wherein the upholstery at least partially covers the cushion part support.

20. The vehicle seat according to claim 18, wherein the upholstery is made of textile.

21. The vehicle seat according to claim 20, wherein the textile is coated with plastic, or leather.

22. The vehicle seat according to claim 18, wherein the upholstery covers only the cushion part.

23. A vehicle seat comprising a seat cushion extending substantially along a plane defined by a longitudinal direction and a transverse direction, the seat cushion comprising:
    a cushion part comprising a main seat cushion surface intended to support at least part of the body of a user of the seat; and
    a cushion part support comprising a first lateral part, a second lateral part opposite the first lateral part in the transverse direction, and an intermediate part located between the first and second lateral parts in the transverse direction, the intermediate part being recessed relative to the lateral parts in an elevation direction substantially perpendicular to the longitudinal and transverse directions;
    wherein the cushion part is mounted on the cushion part support and extends at least partly into an accommodating space for accommodating the cushion part, the accommodating space being delimited by the first lateral part, the second lateral part, and the intermediate part, and wherein the seat cushion comprises an internal structure, the cushion part and the cushion part support being mounted on the internal structure, the internal structure comprising a first lateral part and a second lateral part opposite the first lateral part of the internal structure in the transverse direction, the first and second lateral parts of the internal structure delimiting a volume in which the intermediate part of the cushion part support and the cushion part at least partially extend, wherein each lateral part of the cushion part support comprises a central portion, a joining portion for joining to the intermediate part of the cushion part support, the joining portion extending substantially in the elevation direction, and a covering portion extending substantially parallel to the joining portion, and wherein the central portion, the joining portion and the covering portion delimit an insertion space for inserting a lateral part of the internal structure.

* * * * *